(12) United States Patent
Ning et al.

(10) Patent No.: US 11,475,500 B2
(45) Date of Patent: Oct. 18, 2022

(54) DEVICE AND METHOD FOR ITEM RECOMMENDATION BASED ON VISUAL ELEMENTS

(71) Applicants: Beijing Jingdong Shangke Information Technology Co., Ltd., Beijing (CN); JD.com American Technologies Corporation, Mountain View, CA (US)

(72) Inventors: Guanghan Ning, Sunnyvale, CA (US); Xiaofan Zhang, Mountain View, CA (US); Jui-Hsin Lai, Mountain View, CA (US); Chi Zhang, Fremont, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 631 days.

(21) Appl. No.: 16/531,102

(22) Filed: Aug. 4, 2019

(65) Prior Publication Data

US 2021/0035187 A1   Feb. 4, 2021

(51) Int. Cl.
*G06Q 30/06*       (2012.01)
*G06F 16/583*      (2019.01)
(Continued)

(52) U.S. Cl.
CPC ....... *G06Q 30/0631* (2013.01); *G06F 16/535* (2019.01); *G06F 16/538* (2019.01);
(Continued)

(58) Field of Classification Search
CPC .. G06Q 30/0631; G06Q 30/0461; G06T 7/11; G06T 11/60; G06T 2207/20081; G06T 2207/20084; G06T 2207/20132; G06F 16/5854; G06F 16/538; G06F 16/535; G06F 16/935; G06N 20/00
See application file for complete search history.

(56) References Cited

U.S. PATENT DOCUMENTS 10,109,051 B1 * 10/2018 Natesh ................... G06V 10/56
10,614,342 B1 *  4/2020 Lorbert .................. G06K 9/628
(Continued)

OTHER PUBLICATIONS

Mcauley, et al., Image-based recommendations on styles and substitutes, arXiv:1506.04757v1, Jun. 15, 2015.
(Continued)

*Primary Examiner* — Gregory M Desire
(74) *Attorney, Agent, or Firm* — Scully, Scott, Murphy & Presser, P.C.

(57) ABSTRACT

A method, a device, and a non-transitory computer readable medium for item recommendation based on visual elements. The method includes: determining, by one or more processors, visual elements from an item image of an item; generating, by the one or more processors, an element descriptor for the item based on at least a part of the visual elements; and calculating, by the one or more processors, a compatibility value between the element descriptor and one or more other element descriptors for one or more other items.

16 Claims, 8 Drawing Sheets

(51) Int. Cl.
  G06F 16/535 (2019.01)
  G06F 16/538 (2019.01)
  G06F 16/9535 (2019.01)
  G06T 7/11 (2017.01)
  G06T 11/60 (2006.01)
  G06N 20/00 (2019.01)
(52) U.S. Cl.
  CPC ...... *G06F 16/5854* (2019.01); *G06F 16/9535* (2019.01); *G06N 20/00* (2019.01); *G06T 7/11* (2017.01); *G06T 11/60* (2013.01); *G06Q 30/0641* (2013.01); *G06T 2207/20081* (2013.01); *G06T 2207/20084* (2013.01); *G06T 2207/20132* (2013.01)

(56) References Cited

U.S. PATENT DOCUMENTS

| | | | | |
|---|---|---|---|---|
| 10,747,807 | B1* | 8/2020 | Garg | G06F 16/56 |
| 11,080,918 | B2* | 8/2021 | Chen | G06V 10/764 |
| 11,188,965 | B2* | 11/2021 | Li | G06F 16/583 |
| 2014/0244430 | A1* | 8/2014 | Siegel | G06Q 30/0631 |
| | | | | 705/26.7 |
| 2015/0379168 | A1* | 12/2015 | Galore | G06Q 30/0643 |
| | | | | 703/6 |
| 2021/0035187 | A1* | 2/2021 | Ning | G06T 11/60 |

OTHER PUBLICATIONS

Tautkute, et al., DeepStyle: Multimodal Search Engine for Fashion and Interior Design, arXiv:1801.03002v2, Feb. 20, 2019.

Veit, et al., Learning fashion clothing style with heterogeneous dyadic co-occurrences, arXiv:1509.07473v1, Sep. 24, 2015.

Takagi, et al., What makes a style: experimental analysis of fashion prediction, Computer Vision Workshop (ICCVW), 2017 IEEE International Conference on. Computer Vision Workshops, 2017.

Hsiao, et al., Learning the latent "look": Unsupervised discovery of a style-coherent embedding from fashion images, arXiv:1707.03376v2, Aug. 3, 2017.

Wang, et al., Attentive fashion grammar network for fashion landmark detection and clothing category classification, Proceedings of the IEEE Conference on Computer Vision and Pattern Recognition, 2018.

Nakamura, et al., Outfit Generation and Style Extraction via Bidirectional LSTM and Autoencoder, arXiv:1807.03133v3, Oct. 23, 2018.

Vasileva, et al., Learning Type-Aware Embeddings for Fashion Compatibility, arXiv:1803.09196v2, Jul. 27, 2018.

Han, et al., Automatic spatially-aware fashion concept discovery, arXiv:1708.01311v1, Aug. 3, 2017.

Hsiao, et al., Creating capsule wardrobes from fashion images, arXiv:1712.02662v2, Apr. 14, 2018.

Gong, et al., Instance-level Human Parsing via Part Grouping Network, European Conference on Computer Vision (ECCV Oral), 2018.

Ronneberger, et al., U-Net: Convolutional Networks for Biomedical Image Segmentation, arXiv:1505.04597v1, May 18, 2015.

Newell, et al., Stacked hourglass networks for human pose estimation, arXiv:1603.06937v2, Jul. 26, 2016.

Shi, et al., Convolutional LSTM Network: a machine learning approach for precipitation nowcasting, arXiv:1506.04214v2, Sep. 19, 2015.

Velickovic, et al, Graph attention networks, arXiv:1710.10903v3, Feb. 4, 2018.

* cited by examiner

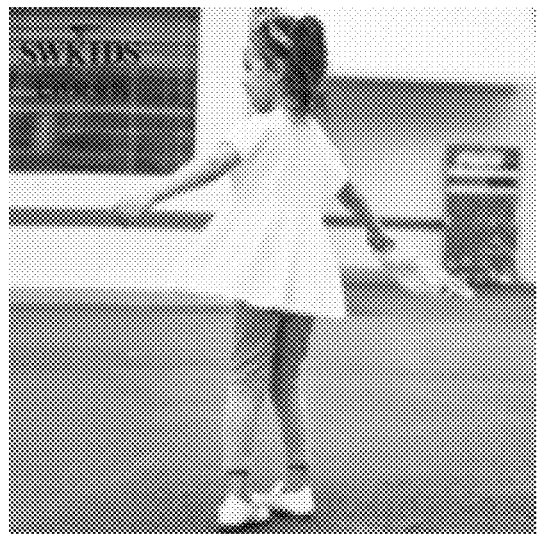
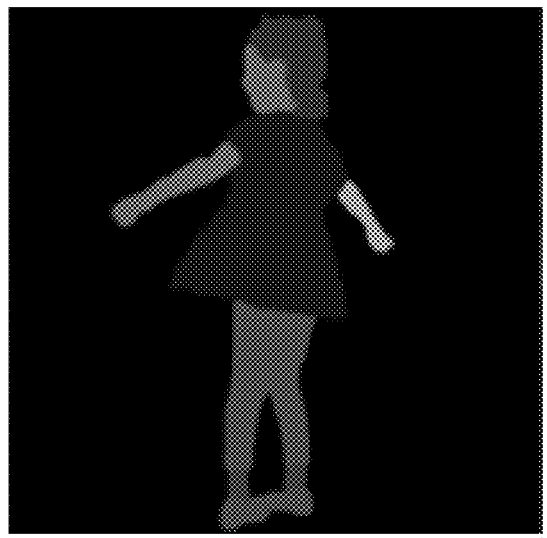
FIG. 3A
FIG. 3B
FIG. 3C
FIG. 3D

DEVICE AND METHOD FOR ITEM RECOMMENDATION BASED ON VISUAL ELEMENTS

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates generally to the field of computer vision, and more particularly to systems, devices and methods for item recommendation based on visual elements.

BACKGROUND

The background description herein is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the rapid development of electronic commerce and the boom of online shopping, visual fashion analysis has attracted lots of interests in computer vision. A lot of approaches have been developed to address problems in fashion compatibility and fashion recommendation recently. One of the mainstream approaches to learn fashion compatibility is achieved via metric learning, which is enabled by selecting co-purchased items and an outfit dataset and calculating distances between the selected items. To measure the compatibility between items, McAuley et al. [1] proposed a method of learning the relation between image features extracted by a pre-trained convolutional neural network (CNN). By using a Siamese network, this feature extraction technique for compatibility learning was improved [2, 3]. These methods can learn complex relationships by merely providing positive and negative sample pairs. However, they are not sufficient to represent the compatibility between fashion items. Their strategies map all fashion items to a common space, which does not appear to have sufficient flexibility to assess the distance between an arbitrary pair of items.

Another kind of approach, on the other hand, involves learning compatibility by regarding items in an outfit as a sequence. The problem with these studies lies in the inability to apply fashion styles that determine the taste of an outfit because these studies only focus on local pairwise relationships.

There is the third approach that tries to capture the underlying fashion style, considering outfits as combinations of fashion items. Fashion styles usually represent different principles of organizing outfits. To realize an advanced fashion recommendation system, these methods focus not only on estimating personal preferences but also on interpreting fashion styles. Takagi et al. [4] gathered and learnt to snap images that are labeled as a typical fashion style. However, some outfits have an ambiguous style and cannot be classified.

Therefore, an unaddressed need exists in the art to address the aforementioned deficiencies and inadequacies.

SUMMARY

In some aspects, the present disclosure relates to a system for providing recommendation for fashion items. In certain embodiments, the embedding space in the system is not derived directly from the item images through CNN. Instead, we extract robust fashion elements first, the elements of which are both representative and diverse (within a fashion item). These elements across a set of items (within an outfit) are used to learn the compatibility. In certain embodiments, the novel character lies in that a single item may consist of various visual elements, and the combination of which may induce different fashion styles. When coupled with different items, the target item may act differently in defining the overall fashion style as well as the overall compatibility. In other words, in the present disclosure, different visual elements in the target item are attended when the item is used to collocate with different sets of clothing.

In some aspects, the present disclosure relates to a method for item recommendation based on visual elements. The method comprises: determining, by one or more processors, visual elements from an item image of an item; generating, by the one or more processors, an element descriptor for the item based on at least a part of the visual elements; and calculating, by the one or more processors, a compatibility value between the element descriptor and one or more other element descriptors for one or more other items.

In some embodiments, the method further comprises: comparing, by the one or more processors, the compatibility value with a compatibility threshold.

In some embodiments, the method further comprises: recommending, by the one or more processors, the one or more other items in response to the compatibility value being greater than or equal to the compatibility threshold.

In some embodiments, the method further comprises: analyzing, by the one or more processors, the determined visual elements so as to determine feature elements from the determined visual elements, in response to the item being collocated with the one or more other items, wherein the feature elements comprise all or part of the determined visual elements.

In some embodiments, the step of generating the element descriptor for the item based on at least a part of the visual elements comprises: generating, by the one or more processors, the element descriptor based on the feature elements.

In some embodiments, the feature elements are determined by two Convolutional long short term memory (ConvLSTM) Networks with attention mechanism.

In some embodiments, before the step of determining visual elements from an item image of an item, the method further comprises steps of: acquiring, by the one or more processors, a raw image comprising the item image; performing, by the one or more processors, human parsing on the raw image to generate a parsed image; and generating, by the one or more processors, the item image based on the raw image and the parsed image.

In some embodiments, the step of generating the item image based on the raw image and the parsed image comprises steps of: cropping, by the one or more processors, the parsed image to generate a cropped parsed image comprising a cropped item region and a cropped non-item region;

filtering out, by the one or more processors, the cropped non-item region from the cropped parsed image, to generate a human parsing mask; and overlaying, by the one or more processors, the human parsing mask with the raw image to generate the item image.

In some embodiments, before the step of generating the element descriptor for the item, the method further comprises: pruning, by the one or more processors, from the visual elements, a visual element that does not satisfy any of the following conditions: overlapping with Scale-invariant Feature Transform (SIFT)/Speed Up Robust Feature (SURF)/Maximally Stable Extremal Region (MSER) keypoints; and overlaying with visual landmarks.

In some embodiments, the step of performing human parsing comprises a step of: executing, by the one or more processors, a human parsing algorithm that is trained based on datasets, wherein the human parsing algorithm is visual-keypoint and/or human-keypoint aided human parsing algorithm.

In some aspects, the present disclosure relates to a system for item recommendation based on visual elements. In certain embodiments, the system includes a computing device. The computing device has a processor and a storage device storing computer executable code. The computer executable code, when executed at the processor, is configured to perform the method described above.

In some aspects, the present disclosure relates to a device for item recommendation based on visual elements. The device comprises: a processor; a memory storing instructions which, when executed by the processor, cause the processor to determine visual elements from an item image of an item, generate an element descriptor for the item based on at least a part of the visual elements, and calculate a compatibility value between the element descriptor and one or more other element descriptors for one or more other items.

In some embodiments, the instructions which, when executed by the processor, further cause the processor to: compare the compatibility value with a compatibility threshold.

In some embodiments, the instructions which, when executed by the processor, further cause the processor to: recommend the one or more other items in response to the compatibility value being greater than or equal to the compatibility threshold.

In some embodiments, the instructions which, when executed by the processor, further cause the processor to: analyze the determined visual elements so as to determine feature elements from the determined visual elements, in response to the item being collocated with the one or more other items, wherein the feature elements comprise all or part of the determined visual elements.

In some embodiments, the instructions which, when executed by the processor, further cause the processor to: generate the element descriptor based on the feature elements.

In some embodiments, the feature elements are determined by two Convolutional long short term memory (ConvLSTM) Networks with attention mechanism.

In some embodiments, the instructions which, when executed by the processor, further cause the processor to: acquire a raw image comprising the item image; perform human parsing on the raw image to generate a parsed image; and generate the item image based on the raw image and the parsed image.

In some embodiments, the instructions which, when executed by the processor, further cause the processor to: crop the parsed image to generate a cropped parsed image comprising a cropped item region and a cropped non-item region; filter out the cropped non-item region from the cropped parsed image, to generate a human parsing mask; and overlay the human parsing mask with the raw image to generate the item image.

In some embodiments, the instructions which, when executed by the processor, further cause the processor to: prune, from the visual elements, a visual element that does not satisfy any of the following conditions: overlapping with Scale-invariant Feature Transform (SIFT)/Speed Up Robust Feature (SURF)/Maximally Stable Extremal Region (MSER) keypoints; and overlaying with visual landmarks.

In some aspects, the present disclosure relates to a system comprising the device as described above.

In some aspects, the present disclosure relates to a non-transitory computer readable medium storing computer executable instructions which, when executed by a processor of a computing device, causes the processor to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIGS. 3A-3D exemplarily illustrate a process for generating an item image from a raw image according to some embodiments of the present disclosure.

DETAILED DESCRIPTION

Figure 1:
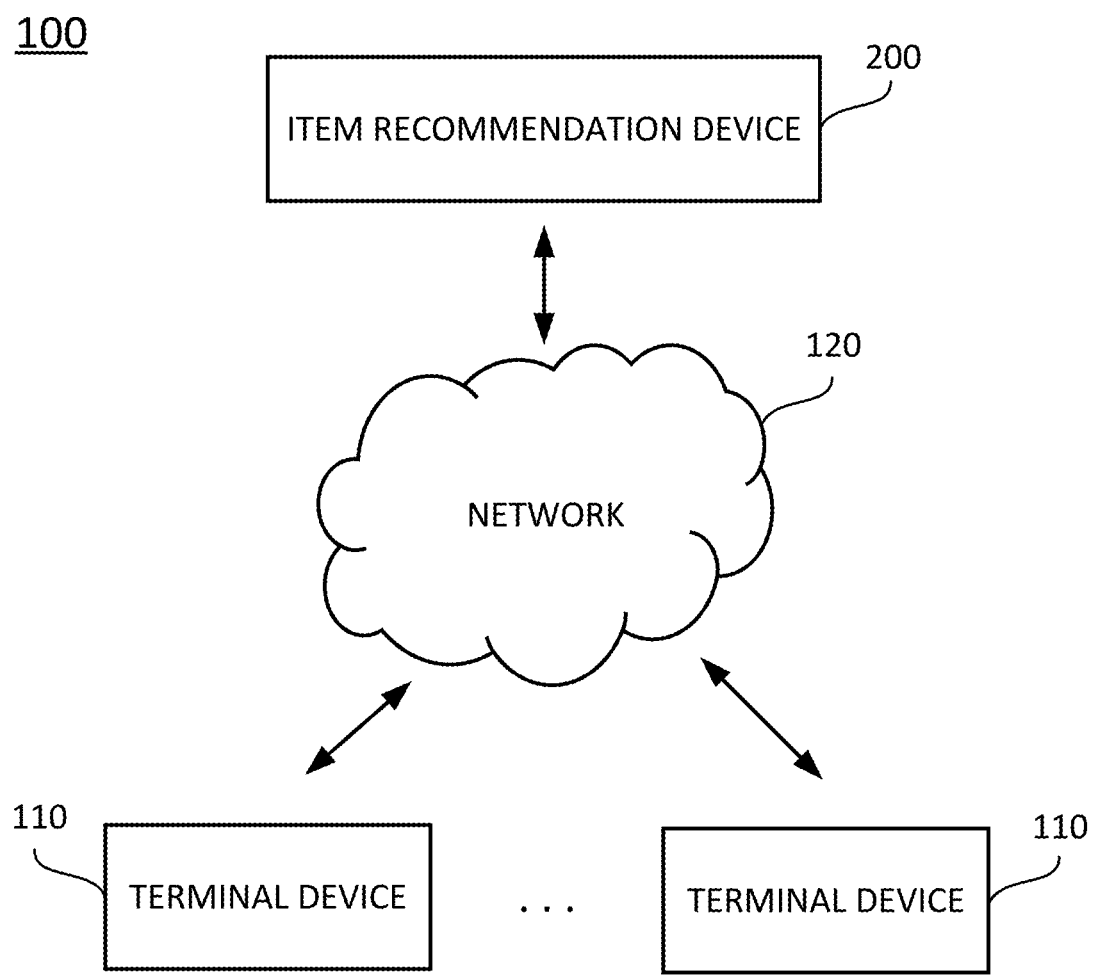
FIG. 1 is a diagram illustrating an exemplary system in which devices and/or methods described herein may be implemented, according to some embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Unless otherwise defined, "first", "second", "third" and the like used before the same object are intended to distinguish these different objects, but are not to limit any sequence thereof.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "having", "containing", "involving", and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term "module" may include memory (shared, dedicated, or group) that stores code executed by the processor.

The term "code", as used herein, may include software, firmware, and/or microcode, and may refer to programs, routines, functions, classes, and/or objects. The term "shared", as used above, means that some or all code from multiple modules may be executed using a single (shared) processor. In addition, some or all code from multiple modules may be stored by a single (shared) memory. The term "group", as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems, and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which some embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 is a diagram illustrating an exemplary system 100 in which devices and/or methods described herein may be implemented, according to some embodiments of the present disclosure. In some embodiments, the system 100 may include a device for fashion recommendation (or an item recommendation device) 200, a plurality of terminal devices 110, and a network 120 communicatively connecting the item recommendation device 200 with one or more of the plurality of terminal devices 110.

In some embodiments, the item recommendation device 200 may determine one or more fashion items (e.g. garments, accessories, etc.) to be recommended for being collocated with a target item/garment (or an item/garment of interest) to form a recommended outfit together with the same, and output information of the recommended outfit, for example, an outfit image, brands, inventories, prices, and/or sizes of respective recommended fashion items/garments within the outfit, and purchasing information, etc. Herein, the target item/garment may refer to an item/garment in which a user is interested. As an example, the target item/garment may be an item/garment added by a user to his/her cart on an e-commerce platform and/or purchased on an e-commerce platform loaded in his/her terminal device 110 etc. It is to be noted that the specific form of the item recommendation device 200 is not limited thereto. For example, the item recommendation device 200 itself may be an application in which e-commerce is conducted, or the item recommendation device 200 may cooperate with other e-commerce applications so as to realize recommendation of item(s). The item recommendation device 200 may connect to the network 120 via any technique, such as wired or wireless connections.

In some embodiments, the terminal device 110 may be a terminal operated by a user. The form of the terminal device is not particularly limited, and in some embodiments, portable devices (for example, smartphones, tablet devices, and laptops) or stationary devices (for example, desktop computers) may be used as the terminal devices 110. The terminal device 110 may connect to the network 120 via any technique, such as wired or wireless connections.

In some embodiments, the network 120 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of network.

Here, as an operation example of the system 100, in response to a user showing his/her interest in an item/garment (a target item/garment) on an e-commerce platform loaded in his/her terminal device 110, for example, adding the item/garment to his/her cart on the e-commerce platform and/or purchasing the item/garment on the e-commerce platform etc., the item recommendation device 200 may determine one or more fashion items to be recommended for being collocated with the target item/garment to form a recommended outfit together with the same, and then send information of the recommended outfit, for example, an outfit image, brands, inventories, prices, and/or sizes of respective recommended fashion items/garments within the outfit, and purchasing information, etc., to the user via the network 120 and display the same on a display unit (not shown) of the terminal device 110 of the user. However, the present disclosure is not limited thereto.

Although FIG. 1 shows exemplary devices and networks of system 100, in other embodiments, system 100 may include fewer, different, differently arranged, or additional devices and/or networks than depicted in FIG. 1. Additionally or alternatively, one or more devices of system 100 may perform one or more of the tasks described as being performed by one or more other devices of system 100.

Hereinafter, a specific example of a device for fashion recommendation based on visual (or fashion) elements according to some embodiments of the present disclosure will be described in detail with reference to FIGS. 2A-2D, FIGS. 3A-3D and FIG. 4.

Figure 2A:
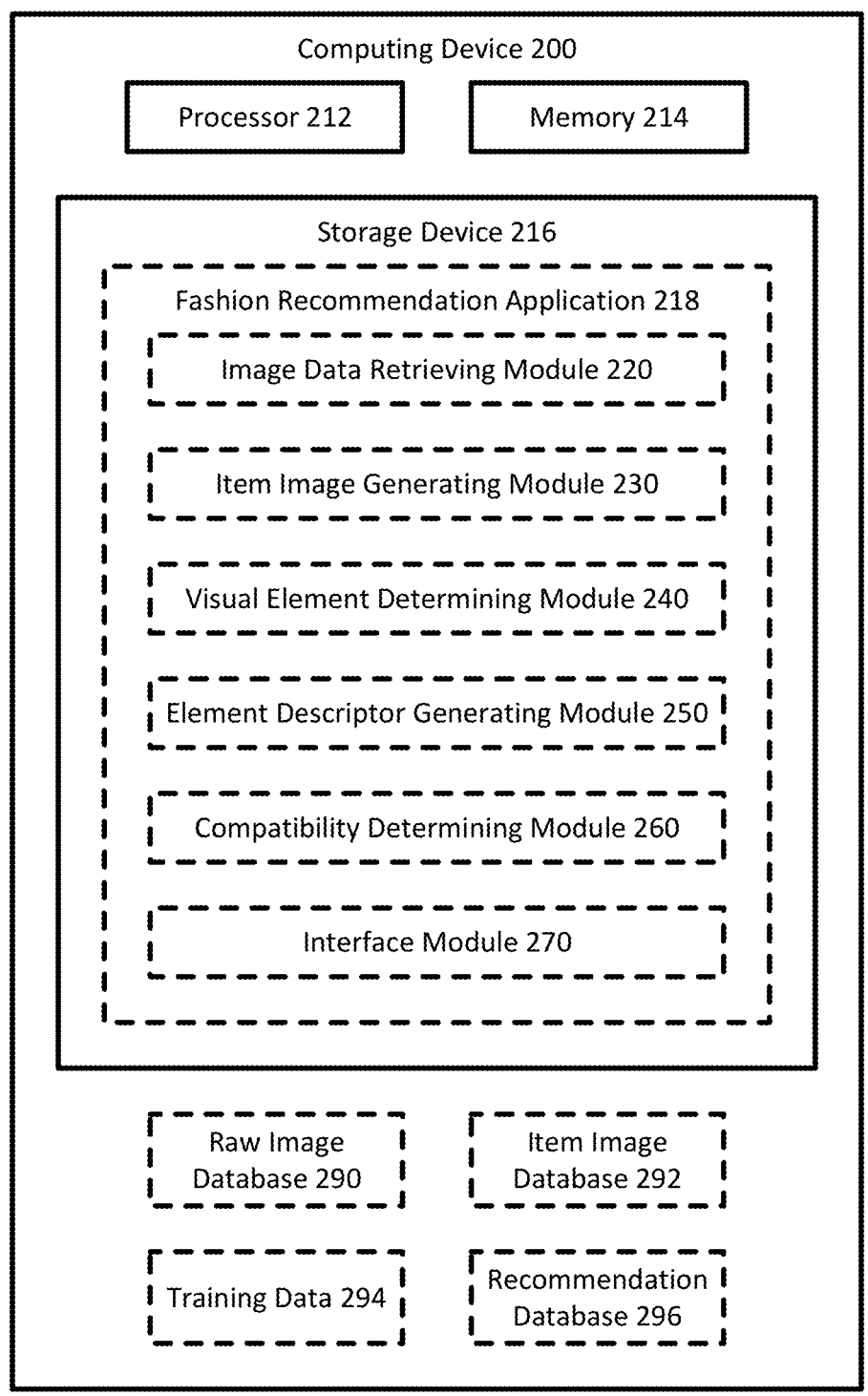
FIG. 2A is a block diagram schematically illustrating an example of the configuration of a computing device for fashion recommendation according to some embodiments of the present disclosure.

FIG. 2A is a block diagram schematically illustrating an example of the configuration of a computing device 200 for fashion recommendation based on visual (or fashion) elements according to some embodiments of the present disclosure. In some embodiments, the computing device 200 may be a server computer, a cluster, a cloud computer, a general-purpose computer, a mobile device, a tablet, or a specialized computer, which may extract fashion elements defining fashion style from each of a plurality of item images of a plurality of fashion items (e.g. garments, accessories, etc.), and determine the compatibility between the fashion elements of the plurality of fashion items/garments, so as to realize fashion recommendation of an outfit formed by part or all of the plurality of items based on the determined compatibility. In some embodiments, the computing device 200 may communicate with other computing devices or services, so as to obtain raw image data for the items from those computing devices or services, generate and maintain (e.g. update) a fashion recommendation database based on the obtained raw image data, and provide the fashion recommendation database to those computing devices or services. In some embodiments, the communication is performed via a network, which may be a wired or wireless network, and may be of various forms, such as a public network and a private network. Further, it is to be noted that the term "fashion element" and the term "visual element" may be used interchangeably herein since a fashion element which can be handled by a computing device (e.g. the computing device 200) has to be visible and a visual element is somehow fashion-related.

As shown in FIG. 2A, the computing device 200 may include, but is not limited to, a processor 212 and a memory 214. Further, the computing device 200 may also include an optional storage device 216. In some embodiments, the computing device 200 may include other hardware components and software components (not shown) to perform its corresponding tasks. Examples of these hardware and software components may include, but not limited to, other required memory, interfaces, buses, Input/Output (I/O) modules or devices, network interfaces, and/or peripheral devices or the like.

The processor 212 may be a central processing unit (CPU) which is configured to control operation of the computing device 200. The processor 212 can execute an operating system (OS) or other applications for the computing device 200. In some embodiments, the computing device 200 may have more than one CPU serving as the processor, such as two CPUs, four CPUs, eight CPUs, or any suitable number of CPUs. The memory 214 may be a volatile memory, such as a random-access memory (RAM), for storing data and instructions for the operation of the computing device 200. In some embodiments, the memory 214 may be a volatile memory array. In some embodiments, the computing device 200 may run on more than one memory 214. Further, the memory 214 may also be a non-volatile memory, such as a Read Only Memory (ROM), Erasable Programmable ROM (EPROM), Electrically EPROM (EEPROM), etc.

The storage device 216 may be a non-volatile data storage media for storing the OS (not shown) and other applications for the computing device 200. Examples of the storage device 216 may include non-volatile memory such as flash memory, memory cards, USB drives, hard drives, floppy disks, optical drives, solid-state drive (SSD) or any other types of data storage devices. In some embodiments, the storage device 216 may be a local storage, a remote storage, or a cloud storage. In some embodiments, the computing device 200 may have multiple storage devices 116, which may be identical storage devices or different types of storage devices, and the applications for the computing device 200 may be stored in one or more of the storage devices 116 of the computing device 200. In some embodiments, the computing device 200 may be a cloud computer, and the processor 212, the memory 214, and the storage device 216 are shared resources provided over the Internet on-demand. In some other embodiments, the computing device 200 may be a workstation communicatively connected to a mainframe server which stores all the data and instructions for operating the computing device 200, and in such a case, the storage device 216 may be optionally omitted.

As shown in FIG. 2A, the storage device 216 may store thereon a fashion recommendation application 218, and at least one of a raw image database 290, an item image database 292, training data 294, and a recommendation database 296. However, some or all of them may be stored in other locations and the present disclosure is not limited thereto. The fashion recommendation application 218 which, when loaded into the memory 214 and executed by the processor 212, may cause the processor 212 to extract fashion elements of each of a plurality of items/garments forming a candidate outfit based on data from the item image database 292 and/or the training data 294, calculate a compatibility value/score of the fashion elements based on data from the training data 294, and store, in the recommendation database 296, information related to the outfit in response to a high compatibility value/score, so as to retrieve one or more outfits from the recommendation database 296 and recommend the same to a user as required. In some embodiments, algorithms or modules for extracting fashion elements and calculating compatibility may be pre-trained, and the training data 294 may not be necessary in the computing device 200. In some embodiments, when one, a few, or a batch of new items are added to the raw image database 290 (or optionally item image database 292), candidate outfits comprising at least one new item may be evaluated, and the candidate outfits that have high compatibility (among the items within the candidate outfits) are stored to the recommendation database 296. In certain embodiments, when a customer purchase one item, outfits having the purchased item are retrieved from the recommendation database 296, and the outfits having high compatibility are provided to the customer as recommendations.

In some embodiments, the fashion recommendation application 218 includes, among other things, an image data acquiring module 220, an item image generating module 230, a visual element determining module 240, an element descriptor generating module 250, a compatibility determining module 260, and an interface module 270. In some embodiments, the fashion recommendation application 218 may include other applications or modules necessary for the operation thereof. It should be noted that the modules are each implemented by computer executable codes or instructions, or data table or databases, which collectively forms one application. In some embodiments, each of the modules may further include sub-modules. In some other embodiments, some of the modules may be combined as one single module. In yet some other embodiments, some modules may be implemented as a circuit instead of executable code. In some further embodiments, some or all of the modules of the fashion recommendation application 218 may be located at a remote computing device or distributed in a cloud.

In some embodiments, the image data acquiring module 220 which, when loaded into the memory 214 and executed by the processor 212, may cause the processor 212 to acquire or receive raw image data from the raw image database 290 or some other module or external device. The raw image may refer to an initial image, which has not been processed (or at least not been processed in a same or similar manner as that described hereinafter), and which is acquired or received from the raw image database 290. It is to be noted that the terms "raw image" and "initial image" may be used interchangeably in present disclosure.

In some embodiments, the image data acquiring module 220 may acquire part or all of the raw images stored in the raw image database 290 at a pre-determined time interval such as daily or weekly or in response to an instruction issued by some other module or external device. In further embodiments, the image data acquiring module 220 may acquire part or all of a set of raw images stored in the raw image database 290 in response to the set of raw images being added to the raw image database 290 or in response to an instruction issued by some other module or external device upon adding the same to the raw image database 290.

In some embodiments, the raw image may be, for example, an image of a human model or anyone/anything else wearing a target item/garment such as a coat, a shirt, a skirt, pants, or the like. Here, the target item/garment refers to an item/garment of interest among a plurality of items/garments depicted in a raw image. In further embodiments, the raw image may be simply an image of a target item/garment which, for example, is hung on a clothes hanger or the like. However, the present disclosure is not limited thereto. In some embodiments, the items are listings on an e-commerce platform, each fashion item has a corresponding record or webpage on the e-commerce platform, and the image data acquiring module 220 retrieves item images from their respective corresponding records or webpages. In some embodiments, the items are products from a store, a warehouse, a manufacture, or a brand, and the image data acquiring module 220 is configured to retrieve or receive item images from corresponding database of the products. For each item in the corresponding database, a record may include an identification number such as a stock keeping unit (SKU) of the item, and an image of the item or an image of the item dressed on a model.

FIG. 3A exemplarily illustrates a raw image acquired by the image data acquiring module 220 according to some embodiments of the present disclosure, wherein the raw image depicts a girl wearing a dress, pants, and shoes, among which the dress, for example, may be the target item. In general, the acquired raw image may include both a target item region and a non-target item region. The non-target item region may contain, for example, a background region, a face region, a hair region, a left arm region, a right arm region, a left leg region, a right leg region, and additional-item regions in which the additional item is not the target item, etc., just to mention a few non-limiting examples. As an example, in the raw image illustrated in FIG. 3A, the dress region may be the target item region, while all the other regions than the dress region, such as the face region, the hair region, the pants region, the shoes region, etc. may belong to the non-target item region. After acquiring the raw image from the raw image database 290, the target item region will be located at pixel-level, so as to better perceive and extract accurate fashion elements from the item for fashion recommendation, which will be described in detail below.

The image data acquiring module 220 which, when loaded into the memory 214 and executed by the processor 212, may further cause the processor 212 to, after acquiring the raw image, send the raw image to the item image generating module 230.

Figure 2B:
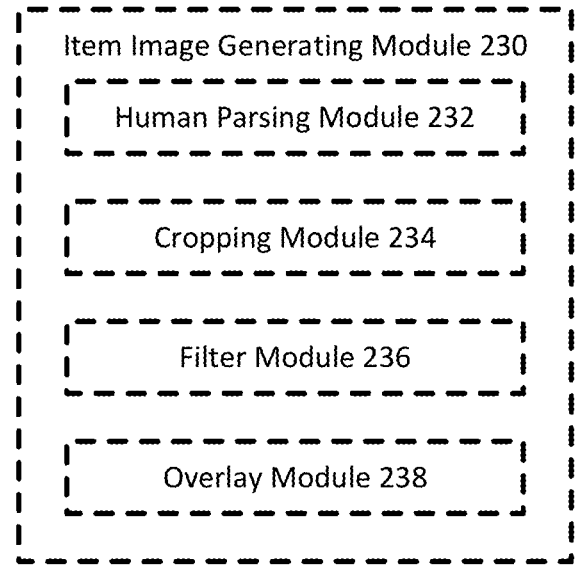
FIG. 2B is a block diagram schematically illustrating an example of the configuration of an item image generating module according to some embodiments of the present disclosure.

In some embodiments, the item image generating module 230 which, when loaded into the memory 214 and executed by the processor 212, may cause the processor 212 to generate an item image based on the acquired raw image. Here, the item image refers to an image in which the non-target item region is removed from the raw image. Since the raw image may contain noise, such as fashion elements contained in the non-target item region, which may significantly reduce the accuracy of the following fashion element extraction procedure, the item image generating module 230 is used to locate the target item at pixel-level and remove the non-target item region from the raw image. As illustrated in FIG. 2B, the item image generating module 230 may include, among other things, a human parsing module 232, a cropping module 234, a filter module 236, and an overlay module 238, but the present disclosure is not limited thereto.

In some embodiments, the human parsing module 232 which, when loaded into the memory 214 and executed by the processor 212, may cause the processor 212 to, upon receiving the acquired raw image, perform human parsing on the raw image so as to generate a parsed image. The term human parsing as used herein may refer to partitioning an image into semantically consistent regions belonging to the body parts or clothes items or fashion landmarks, such that each pixel in the image is assigned a semantic part label. In short, the human parsing may operate on category-level pixel-wise prediction. In some embodiments, the human parsing module 232 may employ a technique described by Gong, et al. [11], which is incorporated herein by reference in its entirety. In some embodiments, the human parsing module 232 may be implemented by a convolutional neural network (CNN). As an example, the human parsing module 232 may be implemented by DeepLab V3+, which is a Semantic Image Segmentation model developed by Google. However, the present disclosure is not limited thereto.

In some embodiments, the human parsing module 232 may be based on human keypoints recognition. In some embodiments, the human keypoint aided human parsing module 232 may be pre-trained on human datasets. Specifically, the human keypoint aided human parsing module 232 may be trained in advance using a set of training data included in the training data 294, where each image in the set of training data may be labeled with their corresponding human features. In some embodiments, N (e.g. N≤255) human related categories (for example, face category, hair category, dress category, shirt category, pants category, shoes category, etc.) may be defined in advance, each of which may have a respective category value in the range of 1 to N (for example, the face category corresponds to a category value of 1, the hair category corresponds to a category value of 2, the dress category corresponds to a category value of 3, . . . , and the shoes category corresponds to a category value of N, and the like). Also, each image in the set of training data may be partitioned into a plurality of (for example, n, which should be less than or equal to N) human related regions according to the predefined categories, and all pixels in each human related region may be assigned the same grayscale value equal to a respective category value. In other words, each of the human related regions corresponds to a respective category and has a respective grayscale value (equal to a respective category value) indicating the respective category. For example, a face region in an image in the set of training data corresponds to the face category, and pixels in the face region may have a same grayscale value of 1 indicating that the region belongs to the face category. For another example, a dress region in an image in the set of training data corresponds to the dress category, and pixels in the dress region may have a same grayscale value of 3 indicating that this region belongs to the dress category.

In some embodiments, the human parsing module 232 may be based on fashion keypoints/fashion landmarks recognition. In some embodiments, the fashion keypoint/fashion landmark aided human parsing module 232 may be pre-trained on fashion datasets. Specifically, the fashion keypoint/fashion landmark aided human parsing module 232 may be trained in advance using a set of training data included in the training data 294, where each image in the set of training data may be labeled with their corresponding fashion features. In some embodiments, M (e.g. M≤255) fashion related categories (for example, neckband category (collar types), wristband category (sleeve types), bowknot category, lace category, etc.) may be defined in advance, each of which may have a respective category value in the range of 1 to M (for example, the neckband category corresponds to a category value of 1, the wristband category corresponds to a category value of 2, the bowknot category corresponds to a category value of 3, . . . , and the lace category corresponds to a category value of M, or the like). Also, each image in the set of training data may be partitioned into a plurality of (for example, m, which should be less than or equal to M) fashion related regions according to the predefined categories, and all pixels in each fashion related region may be assigned the same grayscale value equal to a respective category value. In other words, each of the fashion related regions corresponds to a respective category and has a respective grayscale value (equal to a respective category value) indicating the respective category. For example, a neckband region in an image in the set of training data corresponds to the neckband category, and pixels in the neckband region may have a same grayscale value of 1 indicating that region belongs to the neckband category. For another example, a wristband region in an image in the set of training data corresponds to the wristband category, and pixels in the wristband region may have a same grayscale value of 2 indicating that this region belongs to the wristband category.

After training the human parsing module 232 with labeled data, the raw image acquired by the image data acquiring module 220 may be fed to the human parsing module 232 so as to generate a parsed image. The parsed image may have the same size as that of the acquired raw image. However, as described above, all pixels in each partitioned region, for example, human related region and/or fashion related region, in the parsed image may be assigned the same grayscale values equal to a respective category value, so as to indicate the category to which the partitioned region belongs.

FIG. 3B exemplarily illustrates a parsed image generated from the raw image of FIG. 3A by the human parsing module 232 according to some embodiments of the present disclosure, wherein the raw image is partitioned into a plurality of human related regions, such as a face region, a hair region, a left arm region, a right arm region, a dress region, a pants region, a shoes region, etc., and pixels in each of them are assigned the same grayscale value indicating a respective category.

The human parsing module 232 which, when loaded into the memory 214 and executed by the processor 212, may further cause the processor 212 to, after generating the parsed image, send the parsed image to the cropping module 234.

In some embodiments, the cropping module 234 which, when loaded into the memory 214 and executed by the processor 212, may cause the processor 212 to, upon receiving the parsed image, crop the parsed image to generate a cropped parsed image comprising a cropped target item region and a cropped non-target item region. In some embodiments, the cropping module 234 may crop the parsed image based on a bounding box defined by the maximum X-coordinate, the maximum Y-coordinate, the minimum X-coordinate, and the minimum Y-coordinate of pixels within the target item region in the parsed image, so as to remove most of the non-target item region in the parsed image and generate a cropped parsed image comprising a cropped target item region (and optionally a cropped non-target item region. However, the implementation of the cropping module 234 is not limited thereto. The cropping module 234 which, when loaded into the memory 214 and executed by the processor 212, may further cause the processor 212 to, after cropping the parsed image, send the cropped parsed image to the filter module 236.

In some embodiments, the filter module 236 which, when loaded into the memory 214 and executed by the processor 212, may cause the processor 212 to, upon receiving the cropped parsed image, filter out the cropped non-target item region from the cropped parsed image, so as to generate a human parsing mask. Here, the human parsing mask refers to an image where only pixels in the target item region are assigned a certain non-zero grayscale value indicating the category to which the target item region belongs, while all the other pixels have a grayscale value of zero. In some embodiments, the filter module 236 may reassign a grayscale value of zero to all the pixels in the cropped non-target item region, so as to filter out undesired information related to the non-target item region and generate a human parsing mask that comprising only the target item region. The human parsing mask operates to locate the target item region at pixel-level. However, the implementation of the filter module 236 is not limited thereto. FIG. 3C exemplarily illustrates a human parsing mask generated by the filter module 236 according to some embodiments of the present disclosure, wherein pixels in the target item region (i.e., the dress region) have the same grayscale value indicating that the region belongs to the dress category, while all the pixels in the non-target item region (for example, the left arm region), i.e., the region other than the dress region, have a grayscale value of zero. The filter module 236 which, when loaded into the memory 214 and executed by the processor 212, may further cause the processor 212 to, after generating the human parsing mask, send the human parsing mask to the overlay module 238.

Figure 4:
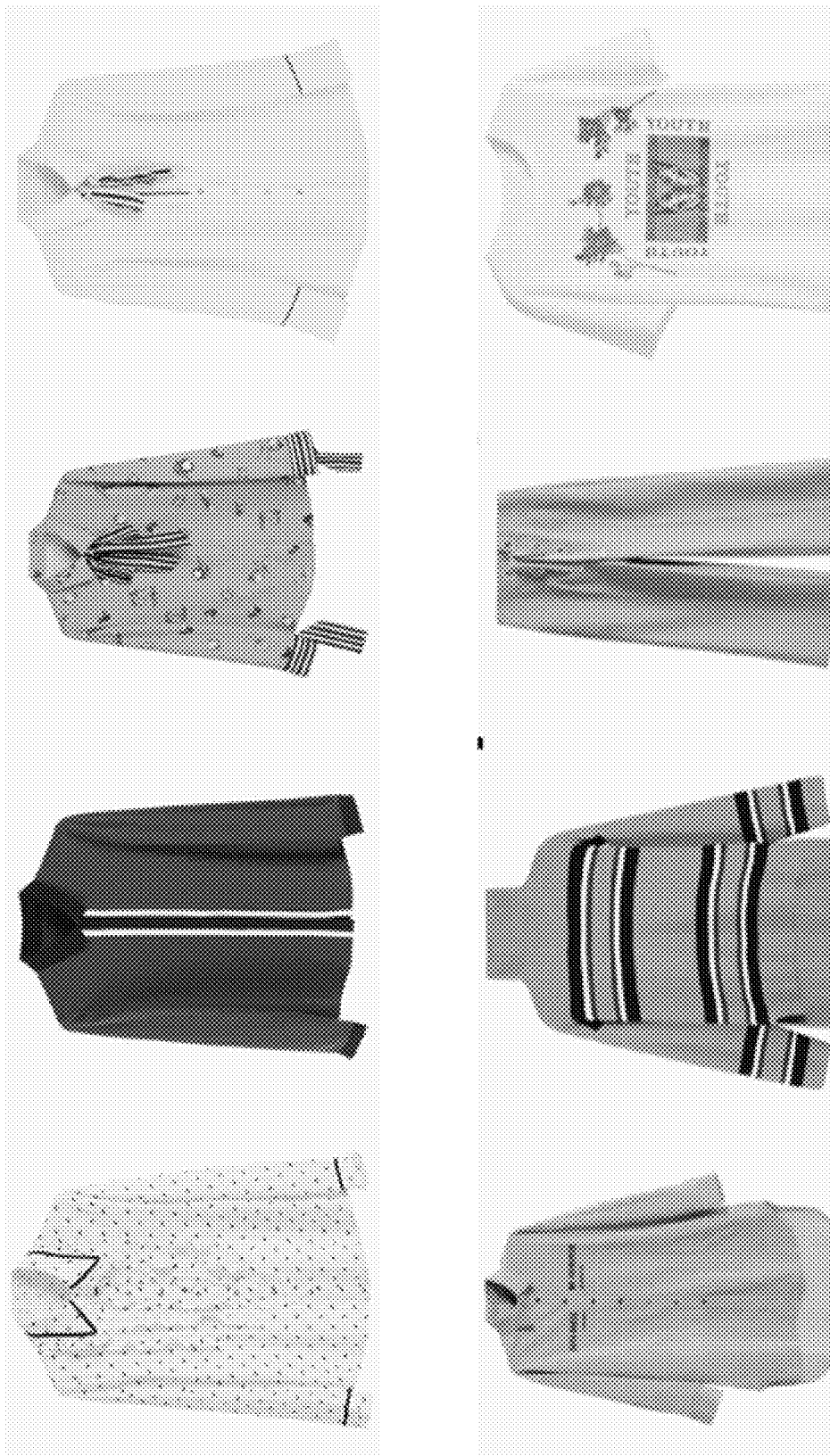
FIG. 4 exemplarily illustrates several item images generated by an item image generating module according to some embodiments of the present disclosure.

In some embodiments, the overlay module 238 which, when loaded into the memory 214 and executed by the processor 212, may cause the processor 212 to, upon receiving the human parsing mask, overlay the human parsing mask with the raw image to generate an item image. In some embodiments, the overlay module 238 may determine a region in the raw image being matched with the human parsing mask as the target item region in the raw image based on coordinates of pixels in both images, and assign a grayscale value of zero to all the pixels within the remaining regions in the raw image (i.e., the non-target item region), so as to generate the item image comprising only the region of interest (ROI), i.e., the target item region. In this way, the non-target item region, such as a background portion, a face portion, etc., in the raw image is removed, only leaving the target item region, which can reduce noise and thus realize a more accurate extraction of fashion elements from the target item, since similar fashion elements may be contained in the non-target item region (for example, similar fashion elements in background wallpapers). However, it is to be noted that the implementation of the overlay module 238 is not limited thereto. FIG. 3D exemplarily illustrates an item image generated from the raw image of FIG. 3A by the item image generating module 230 according to some embodiments of the present disclosure, wherein only the dress region (i.e., the target item region) is retained, while all the other regions, for example, the background region, the face region, the left arm region, the right arm region, etc., are removed. The generated item image may be stored in the item image database 292. In the same way, one or more item images of one or more other items may be generated, and then stored in the item image database 292. FIG. 4 exemplarily illustrates several item images generated by the item image generating module 230 according to some embodiments of the present disclosure.

In some embodiments, the overlay module 238 which, when loaded into the memory 214 and executed by the processor 212, may further cause the processor 212 to, after generating the item image, send the item image to the visual element determining module 240. In some embodiments, the filter module 236 and the overlay module 238 are combined as one module, and are configured to perform the function of overlay the mask to the original image and retrieves the partial image corresponding to the mask. In some embodiments, the partial image obtained by the overlay module 238 also include the category information.

In some embodiments, the visual element determining module 240 which, when loaded into the memory 214 and executed by the processor 212, may cause the processor 212 to extract one or more fashion (or visual) elements from the item images of the items, and determine feature elements from the extracted fashion elements. It is known that a single item/garment may consist of various fashion elements which are both representative and diverse within a fashion item/garment, and the combination of these fashion elements may induce different fashion styles. When collocated with different items, the target item may act differently in defining the overall fashion style as well as the overall compatibility. In other words, different fashion elements in the target item may be attended when the item is used to collocate with different sets of clothing. Based thereon the present solution focuses on fashion elements and learns the compatibility between items on the element-level, instead of working on the item-level (extracting whole item feature into embedding space) or on the outfit-level (overall style of given items). Specifically, in order to learn the compatibility between a set of items/garments for fashion recommendation, the visual element determining module 240 may be used to extract, from each of the item images of the set of items/garments, fashion elements that define fashion styles of respective items/garments, and determine, from among the determined fashion elements, feature elements that define the overall fashion style of and overall compatibility between the set of items/garments, details of which will be described below.

Figure 2C:
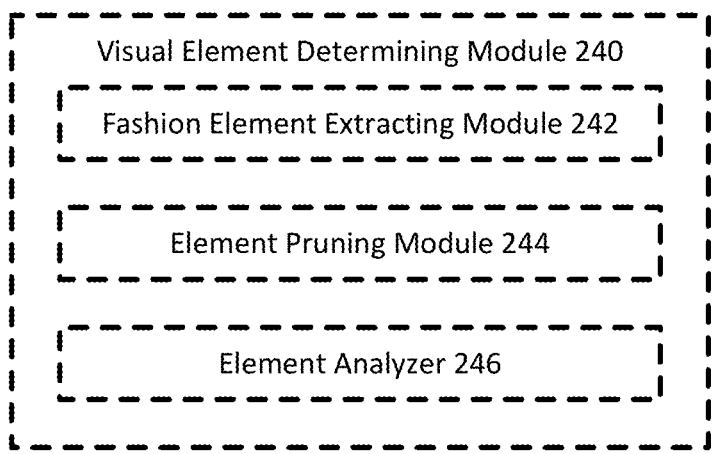
FIG. 2C is a block diagram schematically illustrating an example of the configuration of a visual element determining module according to some embodiments of the present disclosure.

As shown in FIG. 2C, the visual element determining module 240 may include, among other things, a fashion element extracting module 242, an element pruning module 244, and an element analyzer 246. However, the present disclosure is not limited thereto.

In some embodiments, the fashion element extracting module 242 which, when loaded into the memory 214 and executed by the processor 212, may cause the processor 212 to, upon receiving the item image, extract fashion elements from the item image of the item. Here, the fashion elements refer to elements that define fashion styles of an item/garment. In some embodiments, the fashion element extracting module 242 may be implemented by a convolutional neural network (CNN). As an example, the fashion element extracting module 242 may be implemented by a U-Net based CNN (see, for example, Ronneberger, et al., [12], which is incorporated herein by reference in its entirety). In certain embodiments, hourglass is used in the element extracting module 242 [13].

In some embodiments, the fashion element extracting module 242 may be pre-trained on datasets. Specifically, the fashion element extracting module 242 may be trained in advance using a set of training data included in the training data 294, where each item image in the set of training data may be labeled with their corresponding segmentation maps. After training the fashion element extracting module 242 with labeled data, the item image may be fed to the fashion element extracting module 242, so as to extract fashion elements from the item image. In some embodiments, the fashion element extracting module 242 may extract all possible fashion elements $X_i^j$ from the item image of each item $I_{i|i\in[1,N]}$ within a potential candidate of outfit $\phi = \{I_1, I_2, I_3, \ldots, I_i, \ldots, I_N\}$, and meanwhile optionally calculate confidence values of the extracted fashion elements, where the subscript i refers to $i^{th}$ item, N refers to the maximum item count, $X_i^j$ represents the $j^{th}$ fashion element within the $i^{th}$ item. Here, the fashion elements may be feature vectors with the same length (or optionally various lengths) in a vector space. In one embodiment, the fashion elements are represented as a collection, each element in the collection is a part of an area, which consists of pixels (often the result of segmentation). In another embodiment, the fashion elements are represented as a collection, each element within the collection is a subset, which consists of keypoints (often the result of landmark detection). The difference between the two embodiments is that pixels are connected components, the result of segmentation is connected (8-connected); while the keypoints/landmarks can be discrete and disconnected, and at this point, each element is a subset of different capacities. As described below, those fashion elements can be defined by descriptors, where each element may be represented by a vector having the same length, and the vectors are feature vectors in a latent space.

The fashion element extracting module 242 which, when loaded into the memory 214 and executed by the processor 212, may cause the processor 212 to, after extracting fashion elements from the item image of the item, send the extracted fashion elements and their (optional) confidence values to the element pruning module 244. In certain embodiments, ConvLSTM with attention is used to sequentially process different items in an outfit and select certain fashion elements. For one item in different outfits, the selected fashion elements may be different. In certain embodiments, those selected fashion elements of the items are further being pruned.

In some embodiments, the element pruning module 244 which, when loaded into the memory 214 and executed by the processor 212, may cause the processor 212 to, upon receiving the extracted fashion elements and their (optional) confidence values, prune, from the extracted visual elements, a visual element that does not satisfy any of the following conditions: a) overlapping with Scale-invariant Feature Transform (SIFT)/Speed Up Robust Feature (SURF)/Maximally Stable Extremal Region (MSER) keypoints; and b) overlaying with visual landmarks and retain a visual element satisfying the above conditions. Specifically, those fashion elements form a collection, each fashion element is a subset of the collection, and the element pruning module 244 is configured to remove some of the fashion elements, or in other words, to remove some of the subsets. Each subset is a region or several keypoints. In certain embodiments, the element pruning module 244 is configured to determine whether the keypoints of a subset have close Euclidean distance to keypoints detected by SIFT/SURF in space. If it is determined that the Euclidean distance is small, the subset is retained; otherwise, if the keypoints of the subset have no close distanced SIFT/SURF keypoints, the subset is removed. In certain embodiments, the element pruning module 244 is configured to determine whether an area of a subset have a large intersection over union (IOU) with areas obtained by MSER. If it is determined that the IOU is large, the subset is retained, and if IOU is small, the subset is removed.

Kindly note visual elements are areas or regions (having dense pixels or discrete points) detected with unique fashion elements by neural networks. The fashion elements may be comprehensive features such as color, pattern, texture, and physical properties. SIFT/SURF keypoints are the key points in the picture with rotation invariance and scale invariance; those keypoints are not the key of the semantic level, but at a lower level which are robust and can be trusted. The fashion landmarks are certain fixed points at the semantic level, such as points at the sleeves, neckline, buckle, shoulders, etc., which are points that should be emphasized in fashion. In certain embodiments, visual elements are predicted by neural network (UNet, etc.); SIFT/SURF features are obtained using SIFT/SURF algorithms, by finding gradient stable points in Gaussian pyramids of multiple scales; MSER region is obtained by the MSER algorithm, different thresholds may be used in binarization, and maximum stable regions are usually classified into certain classes.

The element pruning module 244 which, when loaded into the memory 214 and executed by the processor 212, may further cause the processor 212 to send retained fashion elements and their (optional) confidence values to the element analyzer 246.

In some embodiments, the element analyzer 246 which, when loaded into the memory 214 and executed by the processor 212, may cause the processor 212 to, upon receiving the retained fashion elements and their (optional) confidence values, analyze the retained fashion elements so as to determine feature elements from the extracted fashion elements. It is to be noted that what fashion elements are more important within an item/garment depends on what other items/garments it is collocated with. For example, a graphic-T can potentially be school-style casual as well as Bohemian. If it is collocated with jeans, the white color of this T shirt may stand out in the fashion elements and form a school-style casual; if it is collocated with Bohemian skirt, boots, and jewelry, the bohemian elements in the graphic of the T-shirt may become more important in defining the outfit style and overall compatibility. Since an outfit is a series of items, defining fashion elements for each item will need the fashion features from other items. The element analyzer 246 is used to analyze fashion elements of a set of items and determine feature elements from the fashion elements by exploring sequentially across the set of items and spatially within each of the set of items, when they are put together to form a candidate outfit. Here, the feature elements refer to one or more of fashion elements of a set of items forming a candidate outfit, which hold more significance in defining the outfit style of and the overall compatibility between the candidate outfit.

In some embodiments, the element analyzer 246 may be implemented by a convolutional neural network (CNN). As an example, the element analyzer 246 may be implemented by two Convolutional long short term memory (ConvLSTM) Networks with attention mechanism (see, for example, Shi et al., [14], which is incorporated herein by reference in its entirety).

In some embodiments, the element analyzer 246 may be pre-trained on datasets. Specifically, the element analyzer 246 may be trained in advance using a set of training data included in the training data 294. After training the element analyzer 246 with labeled data, the retained fashion elements may be sequentially fed to the element analyzer 246, and an attention mechanism for weight calculation of elements may be employed in order to give importance to those elements which hold more significance (or feature elements). In some embodiments, different fashion elements may be assigned different weights based on the confidence values output by the fashion element extracting module 242. As an example, the fashion elements with high confidence values are defined with high weights or retained, and the fashion elements with low confidence values are defined with low weights or discarded. This implementation may save computational effort significantly, but rely heavily on other modules, such as the fashion element extracting module 242. In some embodiments, the attention mechanism may also be implemented by a CNN model, which may be trained in advance using training data labeled according to experts' advices and/or suggestions. After the weight calculation of elements, an element having a relatively low weight, for example, lower than a predefined weight threshold, may be discarded, while an element having a relatively high weight, for example, higher than the predefined weight threshold, may be retained. The retained fashion elements are the so-called feature elements that define the outfit style and the overall compatibility of a candidate outfit. As a result, feature elements are determined from among fashion elements of a set of items forming a candidate outfit.

The element analyzer 246 which, when loaded into the memory 214 and executed by the processor 212, may further cause the processor 212 to, after determining feature elements from the fashion elements, send the feature elements to the element descriptor generating module 250.

In some embodiments, the element descriptor generating module 250 which, when loaded into the memory 214 and executed by the processor 212, may cause the processor 212 to, upon receiving the determined feature elements, generate an element descriptor based on the feature elements. In some embodiments, the element descriptor generating module 250 may be implemented by a convolutional neural network (CNN). The CNN is configured to convert the feature areas into a feature vector having a fixed length. In other words, the CNN extract features from the feature elements.

In some embodiments, the element descriptor generating module 250 may be pre-trained on datasets. Specifically, the element descriptor generating module 250 may be trained in advance using a set of training data included in the training data 294. After training the element descriptor generating module 250 with training data, the feature elements may be fed to the element descriptor generating module 250, so as to generate an element descriptor of the item based on the feature elements. The element descriptor of an item may be a comprehensive feature representation of the item, and contain substantially all the description information of the item, including information about various feature elements thereof. Element descriptors of different items within a candidate outfit may be feature vectors with an identical length of for example, 512, 1024, or 2048. The element descriptor generating module 250 which, when loaded into the memory 214 and executed by the processor 212, may further cause the processor 212 to, after generating the element descriptor, send the element descriptor to the compatibility determining module 260.

Figure 2D:
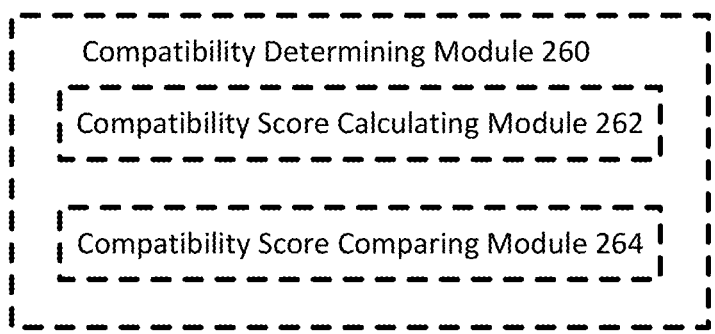
FIG. 2D is a block diagram schematically illustrating an example of the configuration of a compatibility determining module according to some embodiments of the present disclosure.

In some embodiments, the compatibility determining module 260 which, when loaded into the memory 214 and executed by the processor 212, may cause the processor 212 to calculate a compatibility value/score between element descriptors for a set of items/garments forming a candidate outfit, and compare the compatibility value/score with a compatibility threshold. Here, the compatibility value/score between element descriptors may represent the overall compatibility between items/garments within a candidate outfit. It may explicitly show how much an element is compatible with other elements; or, how much an item/garment (represented by a set of elements) is compatible with other items/garments (also represented by a set of elements). Thus, the compatibility determining module 260 is used to determine whether items within a candidate outfit are compatible with each other, or whether compatibility value/score of a candidate outfit is sufficiently high so that it can be a recommended outfit. As illustrated in FIG. 2D, the compatibility determining module 260 may include, among other things, a compatibility score calculating module 262 and a compatibility score comparing module 264. However, the present disclosure is not limited thereto.

In some embodiments, the compatibility score calculating module 262 which, when loaded into the memory 214 and executed by the processor 212, may cause the processor 212 to, after receiving the element descriptors, calculate a compatibility value/score between the element descriptors for the set of items forming the candidate outfit. In some embodiments, the compatibility score calculating module 262 may be implemented by a convolutional neural network (CNN). As an example, the compatibility score calculating module 262 may be implemented by a Graph Attention Network (GAT), which is a neural network architecture operating on graph-structured data (see, for example, Velickovic et al. [15] which is incorporated herein by reference in its entirety).

In some embodiments, the compatibility score calculating module 262 may be pre-trained on datasets. Specifically, the compatibility score calculating module 262 may be trained in advance using a set of training data included in the training data 294. After training the compatibility score calculating module 262 with training data, the element descriptors may be fed to the compatibility score calculating module 262 as nodes in a graph, so as to calculate a compatibility score between element descriptors of a set of items forming a candidate outfit. The higher the compatibility score between the element descriptors, the more compatible the element descriptors or the set of items are. In some embodiments, the compatibility score between element descriptors of a set of items is normalized to 0-1, wherein 0 indicates that element descriptors are distant in the vector space and there is no compatibility at all between the element descriptors or the items, and 1 indicates that the element descriptors are close in the vector space and have substantially perfect compatibility between the element descriptors or the items. In one example, the compatibility score between element descriptors of a set of items is 0.9, which indicates a high compatibility between the element descriptors or a close distance of the element descriptors in the vector space.

The compatibility score calculating module 262 which, when loaded into the memory 214 and executed by the processor 212, may further cause the processor 212 to, after calculating the compatibility score between the element descriptors of a set of items forming a candidate outfit, send the compatibility score to the compatibility score comparing module 264.

In some embodiments, the compatibility score comparing module 264 which, when loaded into the memory 214 and executed by the processor 212, may cause the processor 212 to, upon receiving the compatibility score between the element descriptors of the set of items forming the candidate outfit, compare the compatibility score with a compatibility threshold. In some embodiments, the compatibility threshold may be defined in advance according to fashion experts' advices and/or suggestions. In some embodiments, the compatibility threshold may be defined such that only a certain percentage of compatibility scores of all candidate outfits, for example, 5%, 10%, 15%, 20%, etc., may exceed the compatibility threshold. In some embodiments, in the case where compatibility scores between element descriptors are normalized to 0-1, the compatibility threshold may be set in a range of 0.8-1.0, or above 0.85, or above 0.9 or 0.95. In some embodiments, the threshold is set at about 0.8, or at about 0.85, or at about 0.9 or 0.95.

If the compatibility score of a candidate outfit is greater than or equals to the compatibility threshold, it is determined that the candidate outfit can be a recommended outfit. Then, all the item images of the items forming the outfit will be combined together to generate an outfit image, and the outfit image will be sent to and stored in the recommendation database 296 together with related information of all the items within the outfit so that they can be retrieved from the recommendation database 296 and recommended to a user as required. However, if the compatibility score of a candidate outfit is less than the compatibility threshold, in some embodiments, it may be determined that the candidate outfit cannot be a recommended outfit, and no transmission will be performed.

In some embodiments, the interface module 270 which, when loaded into the memory 214 and executed by the processor 212, may cause the processor 212 to provide an interactive interface for presenting recommendation results to a user, receiving inputs from a user and/or receiving instructions form a manager managing the device 200. In some embodiments, the interface module 270 may provide an interface, such as a graphic user interface (GUI), on a display unit (not shown) of a terminal device (for example, a terminal device 110 of FIG. 1) of a user, so that the user can interact with the device 200 via the interface. In some embodiments, the interface module 270 may present one or more recommended outfits to a user via the interface on the terminal device of the user as required. In some embodiments, the interface module 270 may provide an interface, such as a graphic user interface (GUI), to the manager managing the device 200, so that the manager can interact during the process with the application. As an example, via the interface provided by the interface module 270, the manager may issue an instruction to update the raw image database 290, the training database 294, and/or the recommendation database 296, input or update the compatibility score threshold, and the like. However, the present disclosure is not limited thereto.

In some embodiments, the raw image database 290 may store raw images of items/garments and their description information, such as brands, inventories, prices, and sizes etc., of respective items/garment. The raw image database 290 may be updated at a pre-determined time interval such as weekly or monthly, or in response to an instruction from the manager managing the device 200.

In some embodiments, the item image database 292 may store item images generated by the item image generating module 230.

In some embodiments, the training database 294 may include data for training various modules in the computing device 200. Each set of data in the training data 294 may correspond to a specific module, and be labeled with corresponding features. For example, a set of data may be labeled with corresponding segmentation maps, and the set of data may be used to train the fashion element extracting module 242.

In some embodiments, the recommendation database 296 may store outfit images generated by the compatibility determining module 260 and related information of all the items within the outfits.

Although FIGS. 2A-2D show apparatuses and modules of the computing device 200, in other embodiments, the computing device 200 may include fewer, different, differently arranged, or additional apparatuses and/or modules than depicted in FIGS. 2A-2D. Additionally or alternatively, one or more apparatuses and/or modules of the computing device 200 may perform one or more of the tasks described as being performed by one or more other apparatuses and/or modules of the computing device 200.

Figure 5:
FIG. 5 exemplarily illustrates several recommended outfits created from items/garments by a fashion recommendation application according to some embodiments of the present disclosure.

FIG. 5 exemplarily illustrates several recommendation outfits created from items/garments by the proposed fashion recommendation application 218 according to some embodiments of the present disclosure. In some embodiments, the recommendation outfit(s) may be displayed on a display unit (not shown) of the terminal device 110 shown in FIG. 1. A display form of the recommendation outfit is not particularly limited. For example, display (hereinafter, referred to as a "target item display") 50 of the target item and display (hereinafter, referred to as a "recommendation item display") 52 of the recommendation item(s) may be performed, as shown in FIG. 5. As shown in FIG. 5, the recommendation item display 52 regarding multiple recommendation items capable of appropriately coordinating with the target item may be performed, however, the recommendation item display 52 regarding a single recommendation item capable of appropriately coordinating with the target item may also be performed. As shown in FIG. 5, a plurality of recommendation outfits associated with the target item may be displayed, or a single recommendation outfit associated with the target item may be displayed. The display of the recommendation outfit(s) on the display unit of the terminal device 110 may be performed under the control of a control unit (not shown) of the terminal device 110. The user may select one or more items within the recommendation outfit desired to browse or purchase by referring to the displayed recommendation outfit.

Hereinafter, a method for determining compatibility between items/garments according to some embodiments of the present disclosure will be described in detail with reference to FIG. 6. The same description as that of the aforementioned device for fashion recommendation will be omitted.

Figure 6:
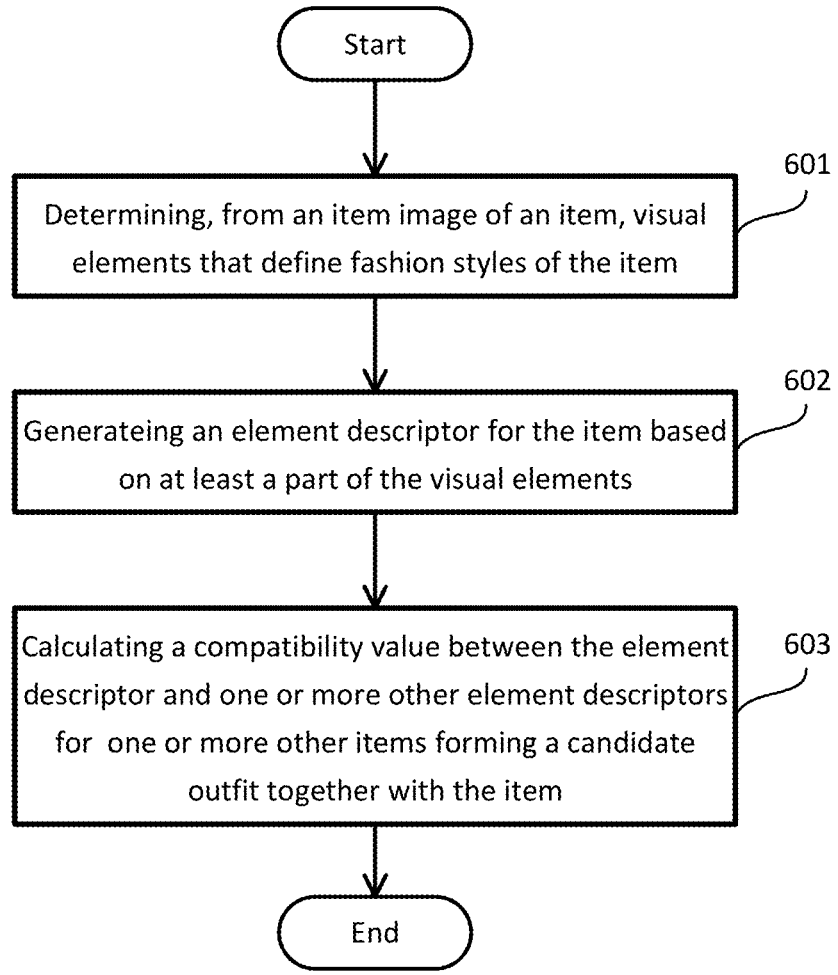
FIG. 6 is a flow chart schematically illustrating a method for determining compatibility between items/garments based on visual (or fashion) elements according to some embodiments of the present disclosure.

FIG. 6 is a flow chart schematically illustrating a method for determining compatibility between items/garments based on visual (or fashion) elements according to some embodiments of the present disclosure. In some embodiments, the method may be implemented by the computing device 200 shown in FIG. 2A. In some embodiments, the method shown in FIG. 6 may correspond to part or all of the function of the fashion recommendation application 218. It should be particularly noted that, unless otherwise stated in the present disclosure, the steps of the method may be arranged in a different order, and are thus not limited to the sequential order as shown in the drawings. The method for determining compatibility between items/garments may include the following steps.

At step 601, the visual element determining module 240 determines, from an item image of an item, visual elements that define fashion styles of the item. The item image is an image of the item (i.e., target item) where background and non-target item region are removed. The step may be implemented by a U-Net based CNN.

At step 602, the element descriptor generating module 260 generates an element descriptor for the item based on at least a part of the visual elements. The element descriptor of an item may be a comprehensive feature representation of the item, and contain substantially all the description information of the item, including that of the various visual elements. Although it is not shown in FIG. 6, feature elements defining the overall fashion style and the overall compatibility of a candidate outfit may be determined from the visual elements of the item when it is collocated with one or more other items to form the candidate outfit, and in this case the element descriptor for the item is generated based on the feature elements (a part of the visual elements). In another case, the element descriptor for the item may be generated based on all the visual elements.

At step 603, the compatibility determining module 260 may calculate a compatibility value between the element descriptor and one or more other element descriptors for the one or more other items forming the candidate outfit together with the item. The compatibility score is a measure of the compatibility between items/garments. The higher the compatibility score between the element descriptors, the more compatible the element descriptors or the items are. With the above steps 601-603, compatibility between items/garments may be determined based on visual elements.

Hereinafter, a method for fashion recommendation according to some embodiments of the present disclosure will be described in detail with reference to FIG. 7.

Figure 7:
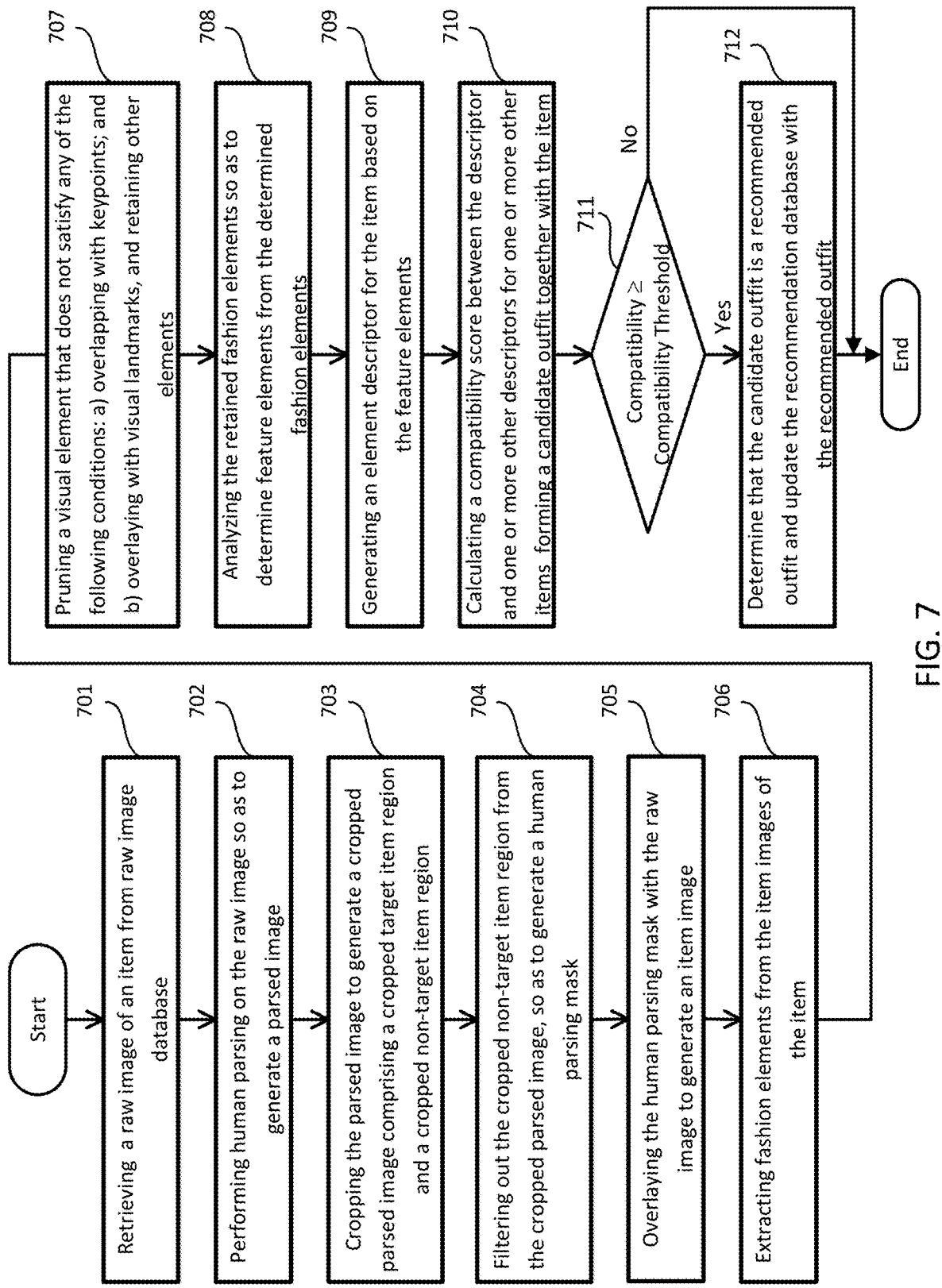
FIG. 7 is a flow chart schematically illustrating a method for fashion recommendation based on visual elements according to some embodiments of the present disclosure.

FIG. 7 is a flow chart schematically illustrating a method for fashion recommendation based on visual (or fashion) elements according to some embodiments of the present disclosure. In some embodiments, the method may be implemented by the computing device 200 shown in FIG. 2A. In some embodiments, the method shown in FIG. 7 may correspond to part or all of the function of the fashion recommendation application 218. It should be particularly noted that, unless otherwise stated in the present disclosure, the steps of the method may be arranged in a different order, and are thus not limited to the sequential order as shown in the drawings. The method for fashion recommendation based on visual (or fashion) elements may include the following steps.

At step 701, the image data acquiring module 220 may acquire or receive a raw image of an item/garment from a raw image database 290. In some embodiments, the raw image of the item may include both a target item region and a non-target item region. After acquiring the raw image, the image data acquiring module 220 sends the raw image to a human parsing module 232.

At step 702, the human parsing module 232, upon receiving the acquired raw image, may perform human parsing on the raw image so as to generate a parsed image. Specifically, the human parsing module 232 may operate to partition the raw image into semantically consistent regions belonging to the body parts or clothes items or fashion landmarks, such that each pixel in the image is assigned a semantic part label. In some embodiments, the human parsing module 232 may be based on human keypoints recognition, and/or based on fashion keypoints/fashion landmarks recognition. The parsed image has the same size as that of the acquired raw image, however, all pixels in each partitioned region within the parsed image are assigned the same grayscale value indicating the category to which the partitioned region belongs. In this way, various partitioned regions including the target-item region may be localized at pixel-level. In some embodiments, the step may be implemented by DeepLab V3+. After generating the parsed image, the human parsing module 232 sends the parsed image to a cropping module 234.

At step 703, the cropping module 234, upon receiving the parsed image, may crop the parsed image so as to generate a cropped parsed image comprising a cropped target item region and a cropped non-target item region. In some embodiments, the cropping module 234 may crop the parsed image based on a bounding box defined by the maximum X-coordinate, maximum Y-coordinate, minimum X-coordinate, and minimum Y-coordinate of pixels within the target item region in the parsed image. As a result, most of the non-target item region is removed from the parsed image. After cropping the parsed image, the cropping module 234 sends the cropped parsed image to a filter module 236. In some embodiments, each raw item image has a label, such as the name of the item, and the label may be used to determine the target item in the image.

At step 704, the filter module 236, upon receiving the cropped parsed image, filters out the cropped non-target item region from the cropped parsed image, so as to generate a human parsing mask. Since the cropped parsed image still comprises a cropped non-target item region, the filter module 236 may be used to reassign a grayscale value of zero to all the pixels in the cropped non-target item region, so as to remove it and generate a human parsing mask. The human parsing mask includes only the target item region, and thus may locate it at pixel-level. After generating the human parsing mask, the filter module 236 sends the human parsing mask to an overlay module 238.

At step 705, the overlay module 238, upon receiving the human parsing mask, overlay the human parsing mask with the raw image so as to generate an item image. The item image is an image of the item (i.e., target item) where non-target item region (including background) is removed. In some embodiments, the generated item image may be stored in the item image database 292. With the above steps 702-705, undesired information is removed from raw images and thus item images are generated, which may help to reduce noise and enable a more accurate extraction of fashion elements for fashion compatibility learning. After generating the item image, the overlay module 238 sends the item image to a fashion element extracting module 240.

At step 706, the fashion element extracting module 242, after receiving item images of a set of items/garments forming a candidate outfit, extracts, from each of the item images, fashion elements that define fashion styles of respective items/garments. In some embodiments, the step may be implemented by a U-Net based CNN. In some embodiments, the fashion elements may be feature vectors with various lengths in a vector space and have respective confidence values. After determining fashion elements of respective item images, the fashion element extracting module 242 sends the extracted fashion elements and their confidence values (optional) to an element pruning module 244.

At step 707, the element pruning module 244, upon receiving the extracted fashion elements and their confidence values (optional), prunes, from the extracted visual elements, a visual element that does not satisfy any of the following conditions: a) overlapping with SIFT/SURF/MSER keypoints; and b) overlaying with visual landmarks, and retains a visual element satisfying the above conditions. After performing pruning on the extracted fashion elements and generating the retained fashion elements, the element pruning module 244 sends the retained fashion elements and their confidence values (optional) to an element analyzer 246.

At step 708, the element analyzer 246, upon receiving the retained fashion elements and their confidence values (optional), analyzes the retained fashion elements so as to determine feature elements from the retained fashion elements. As described above, different fashion elements in an item/garment may act differently in defining the overall fashion style as well as the overall compatibility, when the item/garment is collocated with different items/garments to form an outfit. Thus, the element analyzer 246 is used to determine, from the retained fashion elements of a set of items forming a candidate outfit, feature elements that hold more significance in defining the overall fashion style and the overall compatibility of the outfit. The step may be implemented by two ConvLSTM Networks with attention mechanism. After determining feature elements from the retained fashion elements, the element analyzer 246 sends the feature elements to an element descriptor generating module 250.

At step 709, the element descriptor generating module 250, upon receiving the determined feature elements, generates element descriptors for respective items/garments based on the feature elements. The element descriptor of an item may be a comprehensive feature representation of the item, and contain substantially all the description information of the item, including that of the various visual elements. After generating the element descriptor, the element descriptor generating module 250 sends the element descriptors to a compatibility score calculating module 262.

At step 710, the compatibility score calculating module 262, after receiving the element descriptors, calculates a compatibility value/score between the element descriptors for the set of items forming the candidate outfit. The compatibility score is a measure of the compatibility between items/garments. The higher the compatibility score between the element descriptors, the more compatible the element descriptors or the items are. After calculating the compatibility score between the element descriptors of a set of items forming a candidate outfit, the compatibility score calculating module 262 sends the compatibility score to a compatibility score comparing module 264. In some embodiments, the compatibility score is generated using a graph attention network. When the compatibility score is greater than a threshold value, the items in the outfit is regarded as compatible; otherwise, the items in the outfit is regarded is incompatible. In some embodiments, a blacklist (a pair of items/garments that are incompatible) and a white list (a pair of items/garments that are compatible) may be provided by fashion professionals. When a pair of items in an outfit is listed in the blacklist, there is no need to extract fashion elements, and the outfit is regarded as a bad combination of items and the outfit will not be recommended to the customers.

At step 711, the compatibility score comparing module 264, upon receiving the compatibility score between the element descriptors of the set of items forming the candidate outfit, compares the compatibility score with a compatibility threshold. If the compatibility score of a candidate outfit is greater than or equals to the compatibility threshold, it is determined that the candidate outfit can be a recommended outfit and the process proceeds to step 712. While if the compatibility score of a candidate outfit is less than the compatibility threshold, it is determined that the candidate outfit cannot be a recommended outfit and the process terminates.

At step 712, in response to determining that the compatibility score of a candidate outfit is greater than or equals to the compatibility threshold, the compatibility score comparing module 264 determines that the candidate outfit can be a recommended outfit and updates the recommendation database 296 with the recommended outfit. Specifically, all the item images of the items forming the outfit will be combined together to generate an outfit image, and the outfit image will be sent to and stored in the recommendation database 296 together with related information of all the items within the outfit, so that they can be retrieved from the recommendation database 296 and presented to a user via a terminal device 110 of the user as required.

In summary, some embodiments of the present disclosure provide a flexible and robust item recommendation scheme based on visual elements, which is configured to extract fashion elements from item/garments within a candidate outfit, and learn the overall compatibility between them based on the extracted fashion elements. Further, an interface is provided to present the created wardrobe as well as items information to a user, receive an input from a user, and/or receive instructions from a manager managing the device 200 to execute the application.

It is to be noted that, the fashion recommendation system based on visual elements may be generic in its sub-modules, e.g., the human parsing module 232 and the fashion element extracting module 242, which are replaceable and can be upgraded. In addition, the system can also be used as an API service by third party platforms for fashion compatibility learning and fashion recommendation.

In one example of the disclosure, an outfit is provided by a professional or generated automatically, and the outfit include a plurality of items. Each item has a raw image and identification or name of the item. The raw image is human parsed, such that a part of the raw image corresponding to the item is determined as an item image. The item image is then used to extract fashion features. Each of the items has its respective fashion features, and the fashion features are used to measure the compatibility between the items. In some embodiments, different fashion features of one item may corresponds to different fashion styles. One of the fashion features of an item may be important for measuring the compatibility in one outfit having the item, while another of the fashion feature of the same item may be important for measuring the compatibility in another outfit having the item. In some embodiments, the fashion styles are hidden characters derived from fashion features, and forms the basis of using fashion features instead of the whole item for compatibility evaluation.

In some embodiments of the disclosure, the method and device may be used in an e-commerce platform, where when a customer reviews or purchases one item, the platform provides recommendations of outfits that have the item. In some embodiments of the disclosure, the method and device may be used in a physical store, where when a customer tries on or purchases one item, the physical store provides recommendations of outfits that have the item, for example using a large screen display device in the store.

Comparing with related art, the present disclosure, among other things, have the following advantages: (1) The disclosure provides recommendations based on fashion elements of items instead of items, thus the recommendation is more accurate. (2) the compatibility between a first item to a second item may be mainly based on one of its fashion elements, while the compatibility between the first item and a third item may be mainly based on another one of its fashion elements. Thus, the disclosure provides more flexibility when determining the compatibility between different items. (3) Latent features are considered in fashion element extraction, which provide more accurate prediction for compatibility between items. (4) Fashion keypoints are used to guide human parsing, which improves the accuracy of item segmentation and compatibility prediction.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. MCAULEY, et al., Image-based recommendations on styles and substitutes, arXiv:1506.04757v1, Jun. 15, 2015.
2. TAUTKUTE, et al., DeepStyle: Multimodal Search Engine for Fashion and Interior Design, arXiv: 1801.03002v2, Feb. 20, 2019.
3. VEIT, et al., Learning fashion clothing style with heterogeneous dyadic co-occurrences, arXiv:1509.07473v1, Sep. 24, 2015.
4. TAKAGI, et al., What makes a style: experimental analysis of fashion prediction, Computer Vision Workshop (ICCVW), 2017 IEEE International Conference on. Computer Vision Workshops, 2017.
5. HSIAO, et al., Learning the latent "look": Unsupervised discovery of a style-coherent embedding from fashion images, arXiv:1707.03376v2, Aug. 3, 2017.
6. WANG, et al., Attentive fashion grammar network for fashion landmark detection and clothing category classification, Proceedings of the IEEE Conference on Computer Vision and Pattern Recognition, 2018.
7. NAKAMURA, et al., Outfit Generation and Style Extraction via Bidirectional LSTM and Autoencoder,arXiv: 1807.03133v3, Oct. 23, 2018.
8. VASILEVA, et al., Learning Type-Aware Embeddings for Fashion Compatibility, arXiv:1803.09196v2, Jul. 27, 2018.
9. HAN, et al., Automatic spatially-aware fashion concept discovery, arXiv:1708.01311v1, Aug. 3, 2017.
10. HSIAO, et al., Creating capsule wardrobes from fashion images, arXiv:1712.02662v2, Apr. 14, 2018.
11. GONG, et al., Instance-level Human Parsing via Part Grouping Network, European Conference on Computer Vision (ECCV Oral), 2018.
12. RONNEBERGER, et al., U-Net: Convolutional Networks for Biomedical Image Segmentation, arXiv: 1505.04597v1, May 18, 2015.
13. NEWELL, et al., Stacked hourglass networks for human pose estimation, arXiv:1603.06937v2, Jul. 26, 2016.
14. SHI, et al., Convolutional LSTM Network: a machine learning approach for precipitation nowcasting, arXiv: 1506.04214v2, Sep. 19, 2015.
15. VELICKOVIC, et al, Graph attention networks, arXiv: 1710.10903v3, Feb. 4, 2018.

We claim:

1. A method for item recommendation based on visual elements, the method comprising:
determining, by one or more processors, visual elements from an item image of an item;
analyzing, by the one or more processors, the determined visual elements so as to determine feature elements from the determined visual elements, in response to the item being collocated with one or more other items, wherein the feature elements comprise all or part of the determined visual elements;
generating, by the one or more processors, an element descriptor for the item based on at least a part of the visual elements; and
calculating, by the one or more processors, a compatibility value between the element descriptor and one or more other element descriptors for the one or more other items,
wherein the step of generating the element descriptor for the item based on at least a part of the visual elements comprises:
generating, by the one or more processors, the element descriptor based on the feature elements.

2. The method of claim 1, further comprising:
comparing, by the one or more processors, the compatibility value with a compatibility threshold.

3. The method of claim 2, further comprising:
recommending, by the one or more processors, the one or more other items in response to the compatibility value being greater than or equal to the compatibility threshold.

4. The method of claim 1, wherein the feature elements are determined by two Convolutional long short term memory (ConvLSTM) Networks with attention mechanism.

5. The method of claim 1, wherein before the step of determining visual elements from an item image of an item, the method further comprises steps of:
acquiring, by the one or more processors, a raw image comprising the item image;

performing, by the one or more processors, human parsing on the raw image to generate a parsed image; and generating, by the one or more processors, the item image based on the raw image and the parsed image.

6. The method of claim 5, wherein the step of generating the item image based on the raw image and the parsed image comprises steps of:

cropping, by the one or more processors, the parsed image to generate a cropped parsed image comprising a cropped item region and a cropped non-item region;

filtering out, by the one or more processors, the cropped non-item region from the cropped parsed image, to generate a human parsing mask; and overlaying, by the one or more processors, the human parsing mask with the raw image to generate the item image.

7. The method of claim 5, wherein the step of performing human parsing comprises a step of:

executing, by the one or more processors, a human parsing algorithm that is trained on datasets, wherein the human parsing algorithm is visual-keypoint and/or human-keypoint aided human parsing algorithm.

8. The method of claim 1, wherein before the step of generating the element descriptor for the item, the method further comprising:

pruning, by the one or more processors, from the visual elements, a visual element that does not satisfy any of the following conditions:

a) overlapping with Scale-invariant Feature Transform (SIFT)/Speed Up Robust Feature (SURF)/Maximally Stable Extremal Region (MSER) keypoints; and b) overlaying with visual landmarks.

9. A device for item recommendation based on visual elements, the device comprises:

a processor;

a memory storing instructions which, when executed by the processor, cause the processor to:

determine visual elements from an item image of an item;

analyze the determined visual elements so as to determine feature elements from the determined visual elements, in response to the item being collocated with one or more other items, wherein the feature elements comprise all or part of the determined visual elements;

generate an element descriptor for the item based on at least a part of the visual elements; and calculate a compatibility value between the element descriptor and one or more other element descriptors for the one or more other items, wherein the instructions which, when executed by the processor, further cause the processor to:

generate the element descriptor based on the feature elements.

10. The device of claim 9, wherein the instructions which, when executed by the processor, further cause the processor to:

compare the compatibility value with a compatibility threshold.

11. The device of claim 10, wherein the instructions which, when executed by the processor, further cause the processor to:

recommend the one or more other items in response to the compatibility value being greater than or equal to the compatibility threshold.

12. The device of claim 9, wherein the feature elements are determined by two Convolutional long short term memory (ConvLSTM) Networks with attention mechanism.

13. The device of claim 9, wherein the instructions which, when executed by the processor, further cause the processor to:

acquire a raw image comprising the item image;

perform human parsing on the raw image to generate a parsed image; and generate the item image based on the raw image and the parsed image.

14. The device of claim 13, wherein the instructions which, when executed by the processor, further cause the processor to:

crop the parsed image to generate a cropped parsed image comprising a cropped item region and a cropped non-item region;

filter out the cropped non-item region from the cropped parsed image, to generate a human parsing mask; and overlay the human parsing mask with the raw image to generate the item image.

15. The device of claim 9, wherein the instructions which, when executed by the processor, further cause the processor to:

prune, from the visual elements, a visual element that does not satisfy any of the following conditions:

a) overlapping with Scale-invariant Feature Transform (SIFT)/Speed Up Robust Feature (SURF)/Maximally Stable Extremal Region (MSER) keypoints; and b) overlaying with visual landmarks.

16. A non-transitory computer readable medium storing computer executable instructions which, when executed by a processor of a computing device, causes the processor to:

determine visual elements from an item image of an item;

analyze the determined visual elements so as to determine feature elements from the determined visual elements, in response to the item being collocated with one or more other items, wherein the feature elements comprise all or part of the determined visual elements;

generate an element descriptor for the item based on at least a part of the visual elements; and calculate a compatibility value between the element descriptor and one or more other element descriptors for the one or more other items, wherein the instructions which, when executed by the processor, further cause the processor to:

generate the element descriptor based on the feature elements.

* * * * *